(12) United States Patent
Bustamante et al.

(10) Patent No.: US 6,198,182 B1
(45) Date of Patent: *Mar. 6, 2001

(54) TWO-PHASE STEPPER MOTOR HAVING TWO DISK STATORS WITH SALIENT POLES POSITIONED ON EITHER SIDE OF TWO DISK ROTORS

(75) Inventors: Eleazar Felipe Bustamante, New Hamburg; Phillip G. Adams, Etobicoke; Catherine Hoskin, Georgetown; David Yan Leng, Mississauga; Tan Tang, Toronto; Grigori Roubinchtein, North York, all of (CA)

(73) Assignee: CTS Corporation, Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/397,797

(22) Filed: Sep. 17, 1999

Related U.S. Application Data

(63) Continuation-in-part of application No. 09/146,128, filed on Sep. 2, 1998, now Pat. No. 5,982,058.

(51) Int. Cl.$^7$ .................................................. H02K 37/00
(52) U.S. Cl. ........................... 310/49 R; 310/96; 310/99; 310/268
(58) Field of Search .................................... 310/254, 216, 310/114, 112, 96, 98, 99; 29/596–598

(56) References Cited

U.S. PATENT DOCUMENTS

| | | | |
|---|---|---|---|
| 3,749,458 | * 7/1973 | Thylefors | 308/142 |
| 3,784,850 | * 1/1974 | Inaba et al. | 310/49 R |
| 4,006,375 | 2/1977 | Lyman, Jr. et al. | 310/49 R |
| 4,082,971 | 4/1978 | Miyake et al. | 310/114 |
| 4,645,430 | * 2/1987 | Carleton | 417/359 |
| 4,823,040 | 4/1989 | Oudet | 310/268 |
| 4,973,866 | * 11/1990 | Wang | 310/49 R |
| 5,053,661 | 10/1991 | Kitamura et al. | 310/83 |
| 5,054,940 | * 10/1991 | Momose | 316/156 |
| 5,184,040 | 2/1993 | Lim | 310/114 |
| 5,298,825 | * 3/1994 | Oudet | 384/193 |
| 5,334,893 | * 8/1994 | Oudet | 310/38 |
| 5,512,871 | * 4/1996 | Oudet | 335/220 |
| 5,637,937 | 6/1997 | Nakajima | 310/40 MM |
| 5,814,914 | * 9/1998 | Caamano | 310/216 |
| 5,982,058 | * 11/1999 | Bustamante et al. | 310/49 R |
| 6,037,696 | 3/2000 | Sromin et al. | 310/268 |

FOREIGN PATENT DOCUMENTS

WO 99/13558  *  3/1999  (WO).

* cited by examiner

Primary Examiner—Nestor Ramirez
Assistant Examiner—Tran N Nguyen
(74) Attorney, Agent, or Firm—Mark Bourgeois; Mark Borgman

(57) ABSTRACT

A two-phase electro-mechanical stepper motor has a first and second rotor fixed on a shaft. Permanent magnets are mounted on each of the rotors. The magnets each have several north and south pole magnet regions that are oriented such that the magnet's north and south pole magnet regions are misaligned with respect to the other magnet's north and south pole magnet regions. A first and second stator are mounted around the shaft and positioned adjacent to the permanent magnets. The stators have coils that are wrapped around poles to allow the formation of electromagnets by passing electrical current through the wire coils. A gear train is positioned between the first and second rotors to obtain a higher torque output.

18 Claims, 4 Drawing Sheets

TWO-PHASE STEPPER MOTOR HAVING TWO DISK STATORS WITH SALIENT POLES POSITIONED ON EITHER SIDE OF TWO DISK ROTORS

CROSS REFERENCE TO RELATED APPLICATIONS

This application is a continuation in part of U.S. patent application Ser. No. 09/146,128 filed Sep. 2, 1998 titled, "a two-phase stepper motor", having the same assignee and is herein incorporated by reference.

BACKGROUND OF THE INVENTION

1. Field of the Invention

This invention relates to motors and/or actuators. In particular, there is a two-phase electro-mechanical stepper motor having 1) a high ratio of torque per mass and torque per power draw, to be able to develop required rotating torque, 2) a magnetic circuit that allows developing of a significant holding torque while using a limited amount of electric power, and 3) two disk stators with salient poles are positioned on either side of two disk rotors and 4) a gear train positioned between the rotors.

2. Description of the Related Art

Various devices dealing with stepper motors are legion. Examples of patents related to the present invention are as follows, and each patent is herein incorporated by reference for the supporting teachings:

U.S. Pat. No. 5,512,871 is a rotatable single phase electromagnetic actuator.

U.S. Pat. No. 5,334,893 is a monophase electromagnetic rotary actuator of travel between 60 and 120 degrees.

U.S. Pat. No. 5,298,825 is a single phase electromagnetic actuator with low obstruction.

U.S. Pat. No. 5,054,940 is a ceramic bearing design for attachment to a shaft.

U.S. Pat. No. 4,973,866 is a variable angle stepper motor.

U.S. Pat. No. 4,645,430 is a wet motor fuel pump with self aligning bearing.

U.S. Pat. No. 3,749,458 is a centering device for a rotary shaft.

WIPO PCT patent publication 99/13558 is a brushless DC motor.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicant's claimed invention.

Referring to FIG. 1, there is a cross section of a typical related art rotatable single phase electromagnetic actuator 10. Actuator 10 has a shaft 12 with an axis 13, a stator 14, a rotor 16, and a bearing structure 25. The stator has a magnetic field inducing wire coil 18, a stator pole shoe 20, and a bearing support 24. Bearing assembly 25 includes a top and bottom bearing retaining housing 26, and a plurality of ball bearings 28. The rotor 16 includes a set of rotor magnets 22. Other supporting structures such as a housing and other bearings have been omitted for clarity. It is noted that the actuator illustrates an ideal design, where the bearing parts, stator parts and rotor parts have all respective surfaces appropriately aligned either perpendicular or parallel.

3. Problem with the Related Art

A common problem occurring with multi-position valves is that they require a driving actuator that both 1) develops a significant rotating torque to move from one angular position to another, and 2) can be locked in one of the angular positions, usually by a holding torque. Both competing needs must be met without using large amounts of electric power.

Some specific applications may require more torque than the actuator can provide. A solution to this problem is to add a gear train to an end of the actuator. However, in some applications space constraints may preclude this.

Therefore, there is a need for a stepper motor that both steps to various positions and holds at those positions with low power usage. Additionally, there is a need for a motor that has a poly-phase electric power supply to enable a switch to turn on or off the power to parts of its winding and, for example, reverse the direction of rotation, and there is a need for a motor with an integrated gear train for applications with even higher torque requirements.

SUMMARY OF THE INVENTION

It is a feature of the invention to provide a two-phase electro-mechanical stepper motor having 1) a high ratio of torque per mass and torque per power draw, to be able to develop required rotating torque, 2) a magnetic circuit that allows developing of a significant holding torque while using a limited amount of electric power, and 3) two disk stators with salient poles are positioned on either side of two disk rotors and 4) a gear train positioned between the rotors. Additionally; the motor uses a two-phase electric power supply to enable switching on or off the power to parts of its winding and, for example, reverse the direction of rotation.

An additional feature of the invention is to provide a rotary actuator that includes a shaft. A first and second rotor are rotationally fixed on the shaft. A first and second permanent magnet are fixedly mounted on an outer surface of each of the rotors. The first and second magnets each have a plurality of north and south pole magnet regions that are oriented such that the first magnet's north and south pole magnet regions are misaligned with respect to the second magnet's north and south pole magnet regions. A first and second stator are mounted around the shaft and positioned adjacent to the first and second permanent magnets and have a disc shaped yoke and several first poles and second poles extending away from the yoke, parallel to the shaft, and toward the first and second rotors. Several first and second independent wire coils are wrapped around the first and second poles to allow the formation of several first and second electromagnets by passing electrical current through the first and second wire coils in such a way that the electromagnets in each stator have alternating polarities of N, S, N, S.

A further feature of the invention is to provide a gear train that is positioned between the first and second rotors. The gear train includes a first gear that is attached to the shaft, a second gear engaged with the first gear and an output shaft that passes through and is attached to the second gear.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

BRIEF DESCRIPTION OF THE DRAWINGS

FIG. 5 is an exploded view of an alternative embodiment of the two-phase stepper motor having two disk stators with salient poles positioned on either side of two disk rotors.

Figure 1:
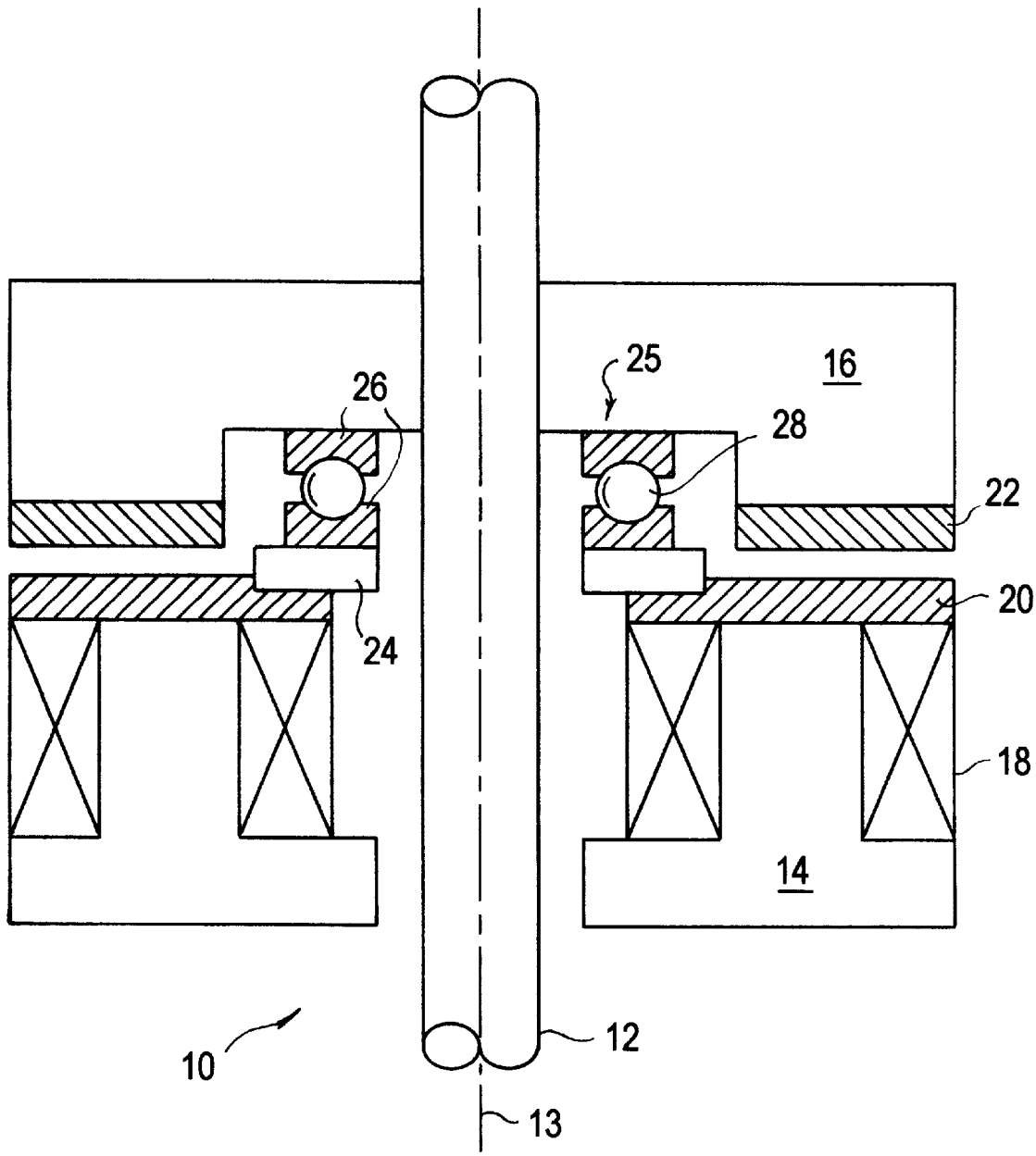
FIG. 1 is a cross-sectional view of a related art actuator.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

Figure 2:
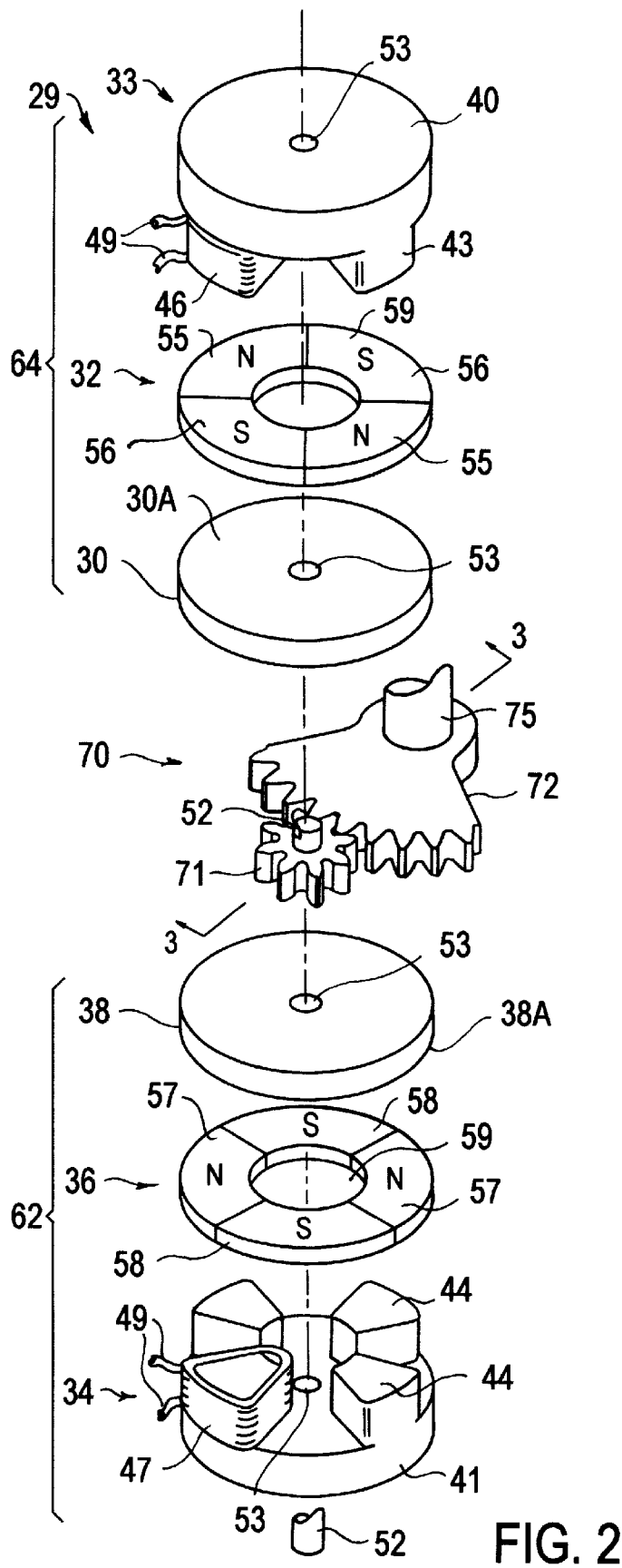
FIG. 2 is an exploded view of the preferred embodiment of the two-phase stepper motor having two disk stators with salient poles positioned on either side of two disk rotors.
Figure 3:
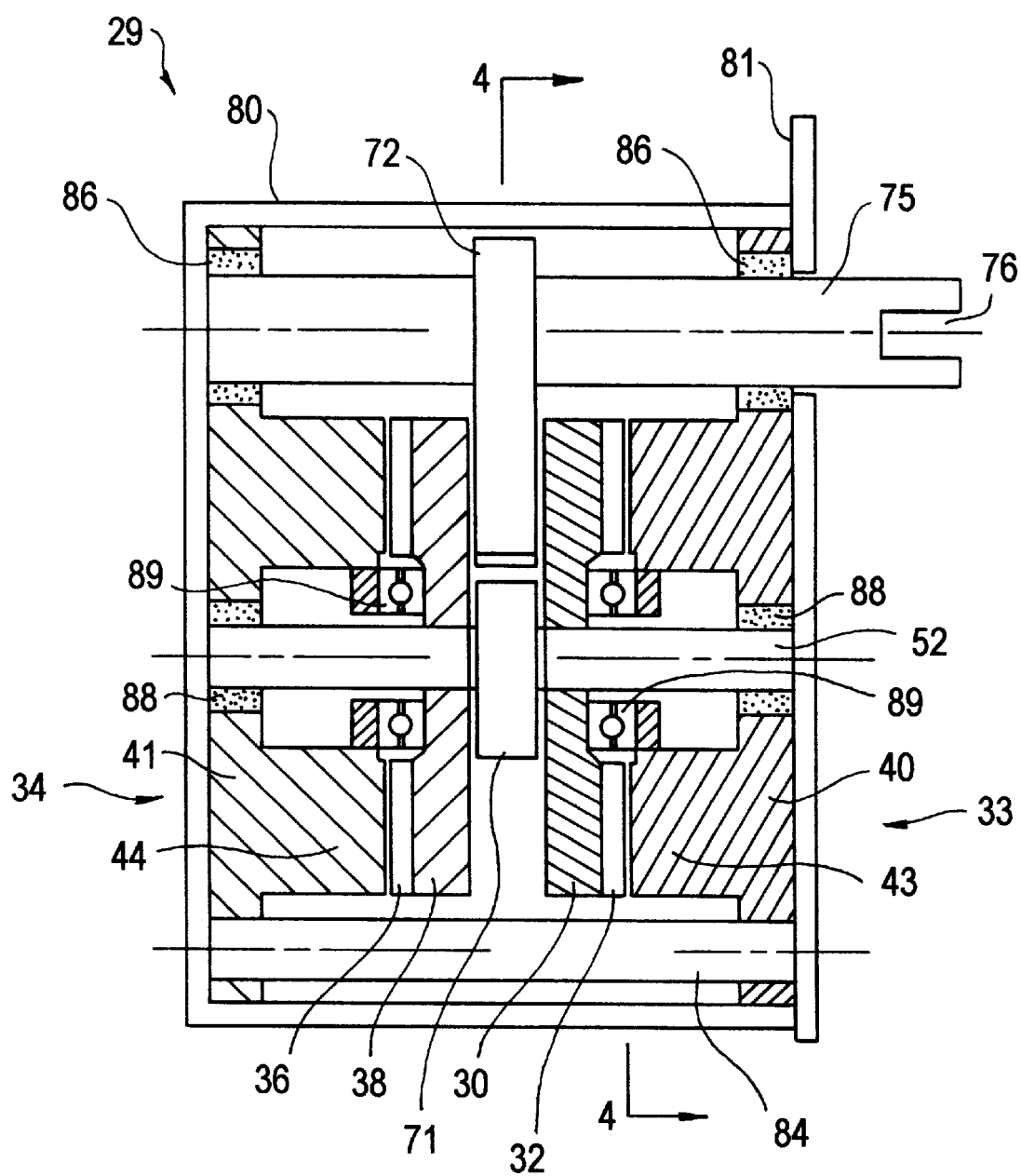
FIG. 3 is a cross-sectional view of the actuator of FIG. 2 in its assembled state with a housing along section line 3—3.
Figure 4:
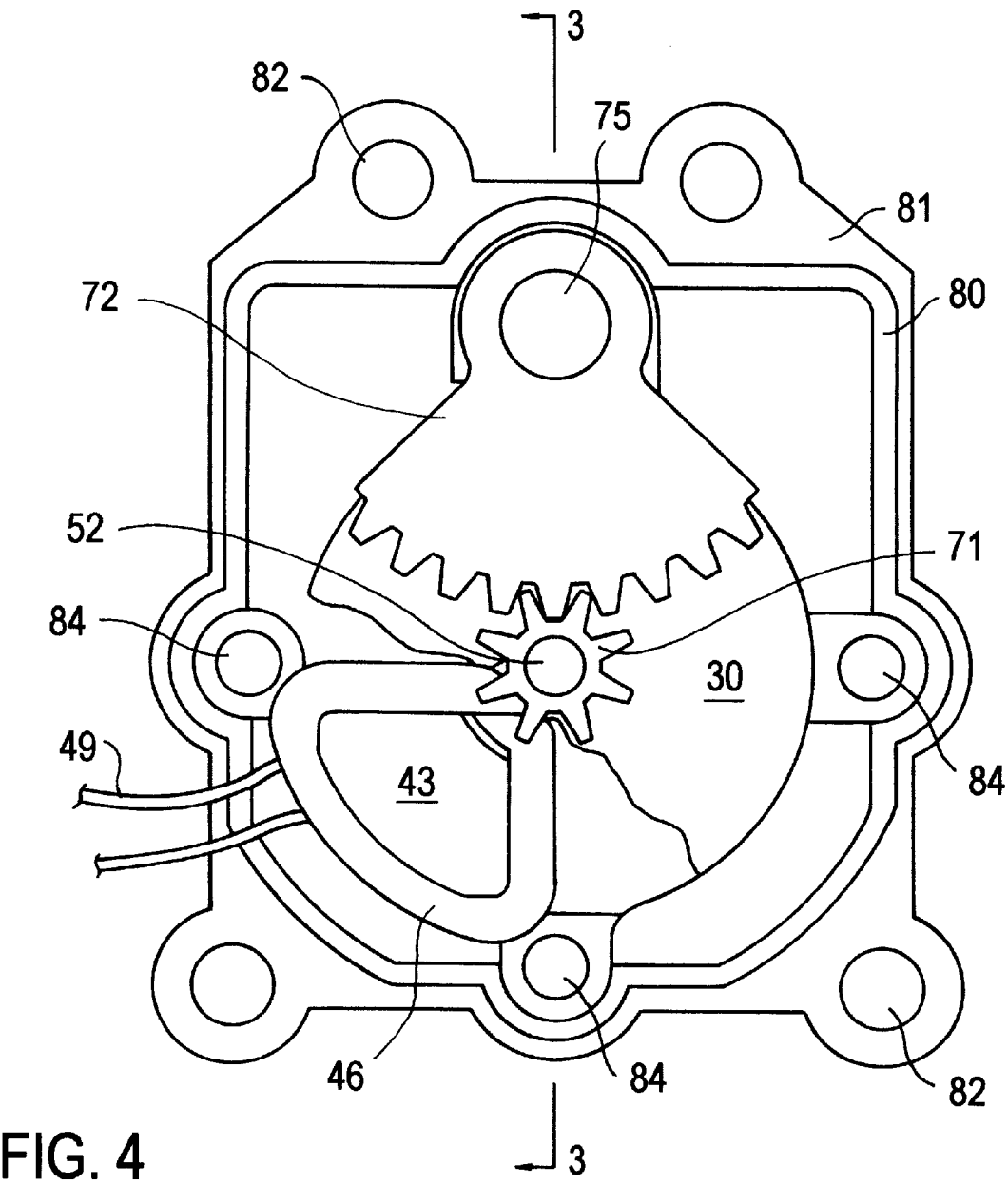
FIG. 4 is a cross-sectional view of FIG. 3 along section line 4—4 with part of the rotor 30 removed.

The present invention provides an electro-mechanical actuator. Referring to FIGS. 2, 3 and 4, there is illustrated a stepper motor or actuator 29. The actuator is contained in a housing 80. Actuator 29 has four major soft-magnetic parts that make up the magnetic circuits of the motor, namely: a first stator 33, second stator 34, a first rotor 30 and a second rotor 38. Rotors 30 and 38 are located between stators 33 and 34. The stators and rotors can be made of conventional electric motor materials such as powdered metal or steel or steel laminations. A metal shaft 52 passes through apertures 53 in the first and second stator 33, 34 and the first and second rotor, 30, 38. The rotors are press fit onto shaft 52. If desired, a splined shaft could be used. Rotor 30 has an outer surface 30A and rotor 38 has an outer surface 38A. Each rotor 30 and 38 has a respective multi-pole permanent magnet 32 and 36 mounted on surfaces 30A and 38A, respectively. There are thus two magnetic circuits or parts of the motor 29, namely a first or top magnetic circuit or portion 64 and a second or bottom portion or magnetic circuit 62. Magnets 32 and 36 preferably are neodymium-iron-boron (NdFeB) magnets.

Stators 33, 34 have disk-shaped yokes 40, 41 which have individual or salient columns or poles 43 and 44 extending out from the yokes toward the rotors. Windings or coils 46 are wrapped around each salient pole 43 in a conventional magnetic winding. Windings or coils 47 are wrapped around each salient pole 44 in a conventional magnetic winding. The coils are copper wire. Each coil has one input and one output wire 49. The wires would be connected to a source of electrical power (not shown). By regulating either the direction of current passing through the coil or by changing the direction of the winding of the coil around the poles, each column can become a north or south electromagnet. The electromagnets are formed by passing electrical current through the wire coils in such a way that the electromagnets in each stator have alternating polarities of N, S, N, S. It is noted that all poles 43 have coils 46 that are connected with each other, thus making up one single electric circuit or "phase" of the motor winding. On the other side of the stator, there is a second phase. Since there are two such electric circuits, making a first and second phase, the motor is called a two-phase motor, where each phase is separately controlled. The stators have stator mounting holes 82 through which stator mounting posts 84 pass through (FIG. 4). The stators are press fit onto the stator mounting posts 84. The stator mounting posts maintain the stators in alignment inside housing 80. A cover 81 is placed over housing 80 to contain the actuator. The cover has mounting holes 82 for mounting the actuator to another object such as an automobile transmission housing.

Multiple-pole magnet 32 has alternating north and south magnet regions 55 and 56 abbreviated as N and S accordingly. Multiple-pole magnet 36 has alternating north and south magnet regions 57 and 58 abbreviated as N and S accordingly. It is noted that the magnet regions are not lined up or are misaligned from the first magnet 32 to the second magnet 36. In particular, region 58 is positioned between region 55 and 56, when viewed along rotating shaft 52. Similarly, magnet region 57 is positioned between region 55 and 56. Additionally, it is noted that the number of stator poles and the number of permanent magnet regions facing the stator poles are always the same.

There is a rotating shaft 52, coupled to both rotors 30 and 38. Shaft 52 passes through stators 33 and 34, supported by shaft bearings 88, and unattachably extends through holes 59 in the permanent magnets. Thrust bearings 89 support the stator and maintain two air gaps of constant length despite the attraction forces developed by the magnets (permanent and electromagnet).

A gear train 70 is located between rotors 30 and 38. Gear train 70 has a small gear 71 and a larger partial gear 72. Shaft 52 passes through and is attached to gear 71. Gear 72 has an output shaft 75 passing therethrough. A slot 76 is formed in an end of output shaft 75 to engage another device to be rotated such as an automobile transmission linkage. The output shaft is supported by output shaft bearings 86. Gear train 70 is able to multiply the torque generated by the actuator to a higher level. Gears 71 and 72 are preferably toothed gears. Gears 71 and 72 may also be other gears such as modulated spur gears.

Operation of the Preferred Embodiment

Referring to the upper magnetic circuit 64, stator 34 is typically rotationally fixed. Shaft 52 is coupled to both rotors 30 and 38 and to gear 71, which is to be rotated. To rotate the gear to a first position, one possible way occurs when poles 43 have coil 46 energized with a DC voltage and current. Top coil 46 converts the top poles 43 into electromagnets. The electromagnets interact with the permanent magnet 32 to produce a rotary torque in one direction. Rotor 30 will move so that its magnetic poles are aligned with the electromagnets of opposite polarity. Once this occurs, the electromagnets cease to produce a rotating torque, and the rotation of the rotor stops.

It is noted that if there is any outside force that moves the rotor from that first position, torque is developed again that forces the rotor into the aligned position. This aligned position is called a detent, holding or locking torque position.

It is possible to rotate the shaft to a second position by doing the same sequence of events with the bottom magnetic circuit 62, and by turning off the top magnetic circuit 64. More particularly, coil 47 is energized to activate the electromagnets on the bottom side of the stator. Since the second permanent magnet 36 has magnet regions 57 and 58 misaligned from the top magnet 32, shaft 52 will rotate to a different locking torque position.

It is also possible to rotate the shaft to a third position by activating both the top and bottom magnetic circuits 62 and 64. Again, since the two permanent magnets have misaligned magnet regions there will be a third locking torque position balanced between the competing torques from the top 64 and bottom 62 portions of the actuator 29.

If in each case the current is reversed in the coils, then the rotors will rotate in the opposite directions, in the three above described situations.

Finally, it is possible to achieve an infinite number of positions in both a forward and reverse direction. This is achieved by varying the amount of DC current passing through the coils. In this situation, the amount of torque achieved is proportional to the strength of the electromagnets, which is controlled by the amount of current flowing through the coils.

Alternative Embodiment

Referring to FIG. 5, there is a perspective exploded view of an alternative embodiment. It is noted, all of the elements are the same as illustrated in the preferred embodiment of FIG. 2, except the following: Actuator or stepper motor 100 has a stator 102 that has the added feature of having poles 43 that are misaligned with poles 44 of stator 34, and permanent magnets 32 and 36 have magnet regions 55 and 56 aligned with magnet regions 57 and 58. With this alternative design, the operation is the same as in the preferred embodiment, except that it is the offset of the poles and not the magnet regions of the magnets that provides the differing locking torque positioning.

Remarks About the Preferred Embodiment

One of ordinary skill in the art of designing and using actuators or stepper motors will realize many advantages from studying and using the preferred embodiment. For example, each magnetic circuit comprises a rotor, a magnet, an air gap, and a stator core can be designed first to be short, and secondly to have a cross section that is approximately the same throughout the circuit, therefore making optimal use of all the soft magnetic parts, and the permanent magnets. This leads to high ratios of torque per mass, and torque per power draw. Further, the positioning of the gear train between the rotors provides for a compact actuator that houses the gears and can be readily assembled at a low cost.

Variations of the Preferred Embodiment

Although the illustrated embodiments discuss the arrangement of an actuator or stepper motor, one skilled in the art will realize that the preferred embodiment would work with most any electric motor.

An additional variation of the invention contemplates the use of applying any type of bearing device 86 and 88 that can allow for proper rotation such as a bushing or journal.

Another variation is the addition of a soft magnetic flat pole shoe located on top of each stator column. Where the shoe is wider than the stator top surface and hangs over the wound coils between the poles. This shoe will widen the arc spanned by the column's top face and therefore, increase the travel angle over which electromagnetic torque is developed.

A further variation of the preferred embodiment is that the multi-pole magnets 32 and 36 could be several individual single pole magnets placed next to each other.

Another variation is to use one coil 46 or 47 on every second pole 43 or 44, instead of one coil on each pole.

Although it is discussed that the rotors 30 and 38 are fixed to shaft 52, it is contemplated to have the rotors fixed only on the rotational direction and not the axial direction. In this case, the rotors can slide along the shaft for various reasons, like easier mounting, or to account for thermal expansion differences in the materials, which provides for a loose fit therebetween. However, it is important to maintain rotational alignment between the stator and actuators.

Although two gears 71 and 72 were shown in gear train 70, more or fewer gears could be used with different numbers of teeth.

Although two stators 33 and 34 and two rotors 30 and 38 were shown, a variation would be to use more than two stator-rotor pairs.

Another variation would be to arrange the stators and rotors in a staggered fashion. For example, stacking a first stator, a first rotor, a second stator and a second rotor adjacent each other would also be equivalent in function to the preferred embodiment.

Although four poles were shown on each stator, using any even number of more or fewer poles could be done. For example 2, 6, 8 or 10 poles could be used.

Although Neodymium-iron-boron (NdFeB) permanent magnets were shown, other types of magnets could be used such as Samarium-Cobalt (SmCo).

What is claimed and desired to be secured by United States Patent is:

1. A rotary actuator, comprising:
   a) a shaft;
   b) a first and second rotor, rotationally fixed on the shaft, and having a first and second permanent magnet, respectively, mounted on an outer surface of each of the rotors, the first and second magnets each having a plurality of north and south pole magnet regions that are oriented such that the first magnet's north and south pole magnet regions are aligned with respect to the second magnet's north and south pole magnet regions;
   c) a first and second stator, mounted around the shaft and positioned adjacent to the first and second permanent magnets, respectively and having a disc shaped yoke and a plurality of first poles and second poles extending away from the yoke, parallel to the shaft, and toward the first and second rotors respectively, the first and second poles are oriented such that the first poles are misaligned with the second poles;
   d) a plurality of first and second independent wire coils wrapped around the first and second poles respectively to allow the formation of a plurality of first and second electromagnets respectively by passing electrical current through the first and second wire coils; and
   e) a gear train positioned between the first and second rotors.

2. The rotary actuator according to claim 1, wherein the gear train comprises:
   a) a first gear attached to the shaft;
   b) a second gear engaged with the first gear.

3. The rotary actuator according to claim 2, wherein an output shaft passes through and is attached to the second gear.

4. A rotary actuator, comprising:
   a) a shaft;
   b) a first and second rotor, rotationally fixed on the shaft, and having a first and second permanent magnet, respectively, mounted on an outer surface of each of the rotors, the first and second magnets each having a plurality of north and south pole magnet regions that are oriented such that the first magnet's north and south pole magnet regions are misaligned with respect to the second magnet's north and south pole magnet regions;
   c) a first and second stator, mounted around the shaft and positioned adjacent to the first and second permanent magnets, respectively and having a disc shaped yoke and a plurality of first poles and second poles extending away from the yoke, parallel to the shaft, and toward the first and second rotors respectively;

d) a plurality of first and second independent wire coils wrapped around the first and second poles respectively to allow the formation of a plurality of first and second electromagnets respectively by passing electrical current through the first and second wire coils; and e) a gear train positioned between the first and second rotors.

5. The rotary actuator according to claim 4, wherein the gear train comprises:

a) a first gear attached to the shaft;

b) a second gear engaged with the first gear.

6. A rotary actuator, comprising:

a) a shaft;

b) a first and second rotor, rotationally fixed on the shaft, and having a first and second permanent magnet, respectively, mounted on an outer surface of each of the rotors, the first and second magnets each having a plurality of north and south pole magnet regions that are oriented such that the first magnet's north and south pole magnet regions are misaligned with respect to the second magnet's north and south pole magnet regions;

c) a first and second stator, mounted around the shaft and positioned adjacent to the first and second permanent magnets, respectively and having a disc shaped yoke and a plurality of first poles and second poles extending away from the yoke, parallel to the shaft, and toward the first and second rotors respectively; and d) a plurality of first and second independent wire coils wrapped around the first and second poles respectively to allow the formation of a plurality of first and second electromagnets respectively by passing electrical current through the first and second wire coils.

7. The rotary actuator of claim 6, wherein the first and second magnets are polarized in a way that will allow the shaft to rotate to a first position when only the first electromagnets are energized, and the shaft is rotated to a second position when only the second electromagnets are energized.

8. The rotary actuator according to claim 1, wherein the electromagnets generate a magnetic field that is parallel to the shaft and causes rotation of the shaft.

9. The rotary actuator according to claim 1, wherein the plurality of first poles comprises four first poles spaced equidistant around the yoke and the plurality of second poles comprises four second poles spaced equidistant around the yoke.

10. The rotary actuator according to claim 1, wherein the actuator is contained within a housing.

11. A rotary actuator, comprising:

a) a shaft;

b) a first and second rotor, rotationally fixed on the shaft, and having a first and second permanent magnet, respectively, mounted on an outer surface of each of the rotors, the first and second magnets each having a plurality of north and south pole magnet regions that are oriented such that the first magnet's north and south pole magnet regions are aligned with respect to the second magnet's north and south pole magnet regions;

c) a first and second stator, mounted around the shaft and positioned adjacent to the first and second permanent magnets, respectively and having a disc shaped yoke and a plurality of first poles and second poles extending away from the yoke, parallel to the shaft, and toward the first and second rotors respectively, the first and second poles are oriented such that the first poles are misaligned with the second poles; and d) a plurality of first and second independent wire coils wrapped around the first and second poles respectively to allow the formation of a plurality of first and second electromagnets respectively by passing electrical current through the first and second wire coils.

12. The rotary actuator of claim 11, wherein the first and second magnets are polarized in a way that will allow the shaft to rotate to a first position when only the first electromagnets are energized, and the shaft is rotated to a second position when only the second electromagnets are energized.

13. The rotary actuator according to claim 11, wherein the electromagnets generate a magnetic field that is parallel to the shaft and causes rotation of the shaft.

14. The rotary actuator according to claim 11, wherein the plurality of first poles comprises four first poles spaced equidistant around the yoke and the plurality of second poles comprises four second poles spaced equidistant around the yoke.

15. The rotary actuator according to claim 11, wherein the actuator is contained within a housing.

16. A rotary actuator, comprising:

a) a shaft;

b) a first and second rotor, rotationally fixed on the shaft;

c) first and second magnet means, mounted on an outer surface of each of the rotors, respectively, for generating a magnetic field, the magnet means each having a plurality of north and south pole magnet regions;

d) a first and second stator, mounted around the shaft and positioned adjacent to the first and second magnet means, respectively and having a plurality of first poles and second poles extending, parallel to the shaft, and toward the first and second rotors respectively; and e) a plurality of first and second independent wire coils wrapped around the first and second poles respectively to allow the formation of a plurality of first and second electromagnets respectively by passing electrical current through the first and second wire coils.

17. The rotary actuator according to claim 16, wherein the first and second magnet means are oriented such that the first magnet means north and south pole regions are misaligned with respect to the second magnet means north and south pole regions.

18. The rotary actuator according to claim 16, wherein the first and second poles are oriented such that the first poles are misaligned with the second poles.

* * * * *